United States Patent [19]

Alex

[11] 4,107,865
[45] Aug. 22, 1978

[54] LONG LINE COILING APPARATUS

[76] Inventor: Wayne E. Alex, Box 95, Juneau, Ak. 99802

[21] Appl. No.: 763,620

[22] Filed: Jan. 28, 1977

[51] Int. Cl.² ............................................. A01K 91/00
[52] U.S. Cl. ........................................ 43/27.4; 242/82
[58] Field of Search ......................... 43/27.4; 226/172; 242/47, 82, 83

[56] References Cited

U.S. PATENT DOCUMENTS

| | | | |
|---|---|---|---|
| 1,619,512 | 3/1927 | Heckman | 43/27.4 X |
| 1,768,981 | 7/1930 | Henrikson | 43/27.4 X |
| 2,810,980 | 10/1957 | Puretic | 43/8 |
| 3,103,237 | 10/1963 | Crum | 242/83 X |
| 3,452,785 | 7/1969 | McLean et al. | 242/82 |
| 3,626,630 | 12/1971 | Tison | 43/27.4 X |
| 3,765,614 | 10/1973 | Bartl et al. | 242/47 |
| 3,841,011 | 10/1974 | Tison | 43/27.4 X |
| 3,903,632 | 9/1975 | Tison et al. | 43/27.4 X |

Primary Examiner—Russell R. Kinsey
Assistant Examiner—Daniel J. Leach
Attorney, Agent, or Firm—Bacon & Thomas

[57] ABSTRACT

A vessel is provided with a power driven wheel or gurdy for hauling in long lines having gangions and hooks at spaced intervals. The line and gangions are guided into a rotary coiler which deposits successive loops of the line on a moving conveyor belt, thus displacing each successive loop from the previous loop to facilitate manual selection and baiting the hooks without undue tangling of the line and gangions. The conveyor belt then deposits the coiled line in a suitable receiver with the coils more or less concentrically superimposed. The conveyor is also laterally oscillated when the belt is stopped to minimize snarling of lines when coiled in a single stack. Selectively operable manual controls are used to regulate the speed of the conveyor belt and the oscillation thereof.

4 Claims, 5 Drawing Figures

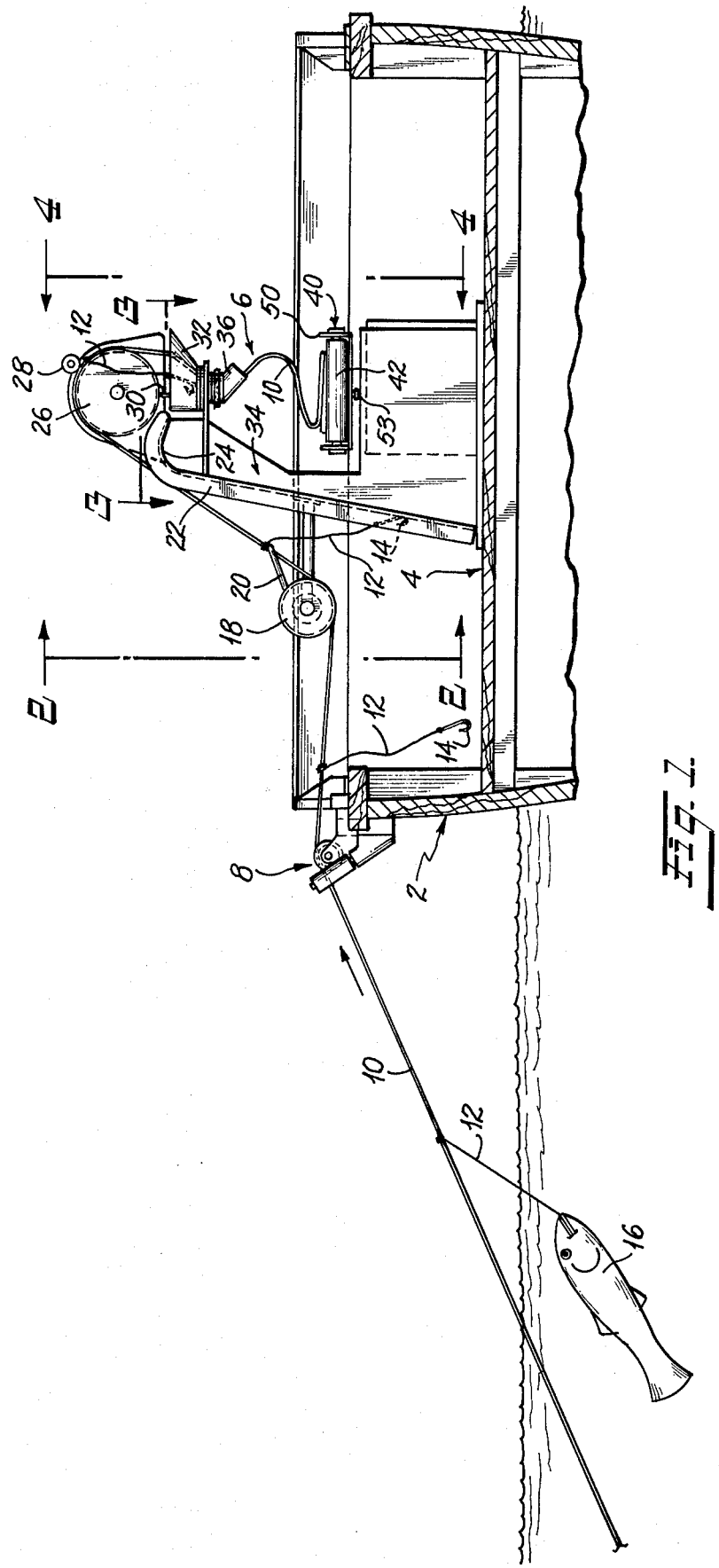

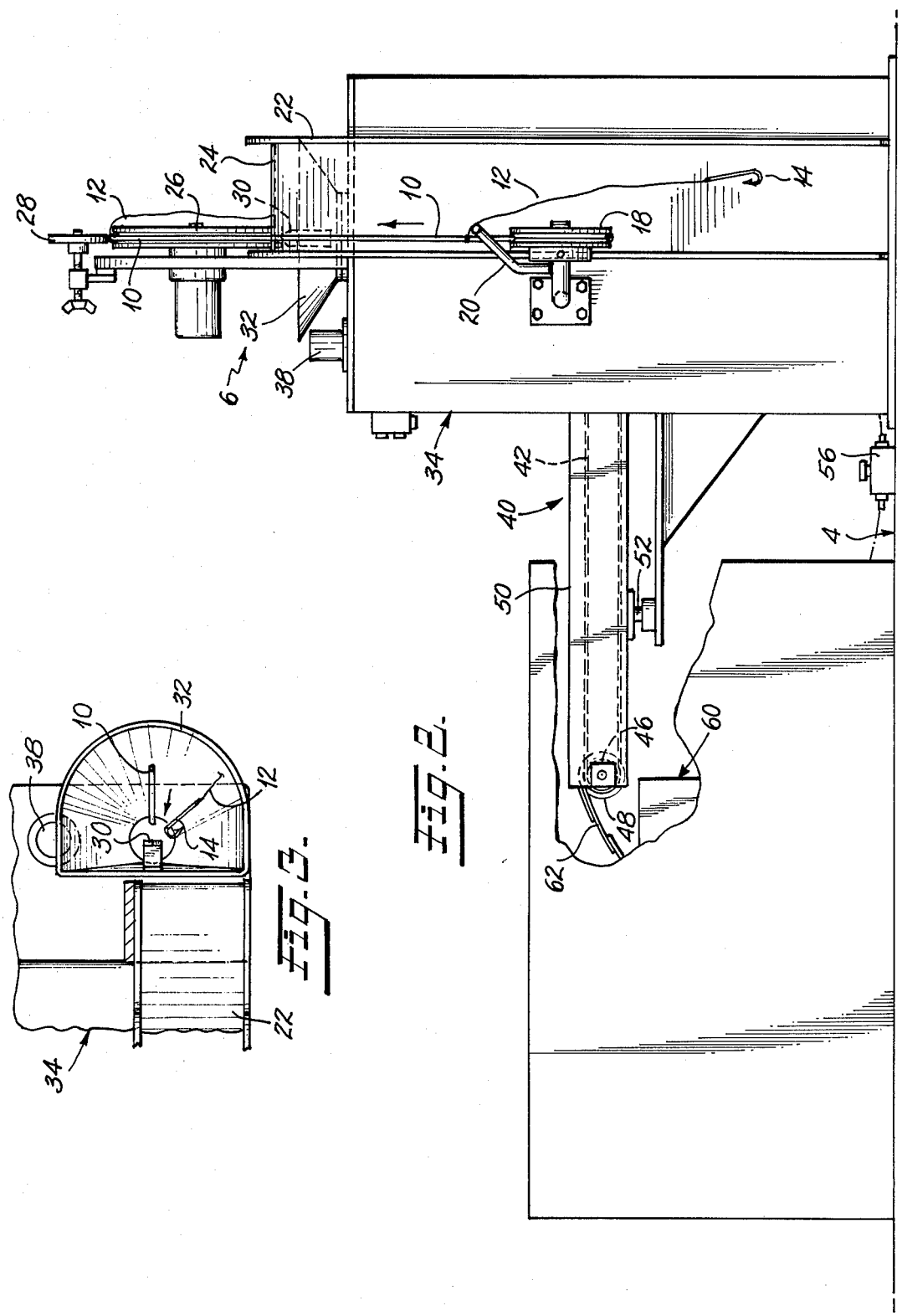

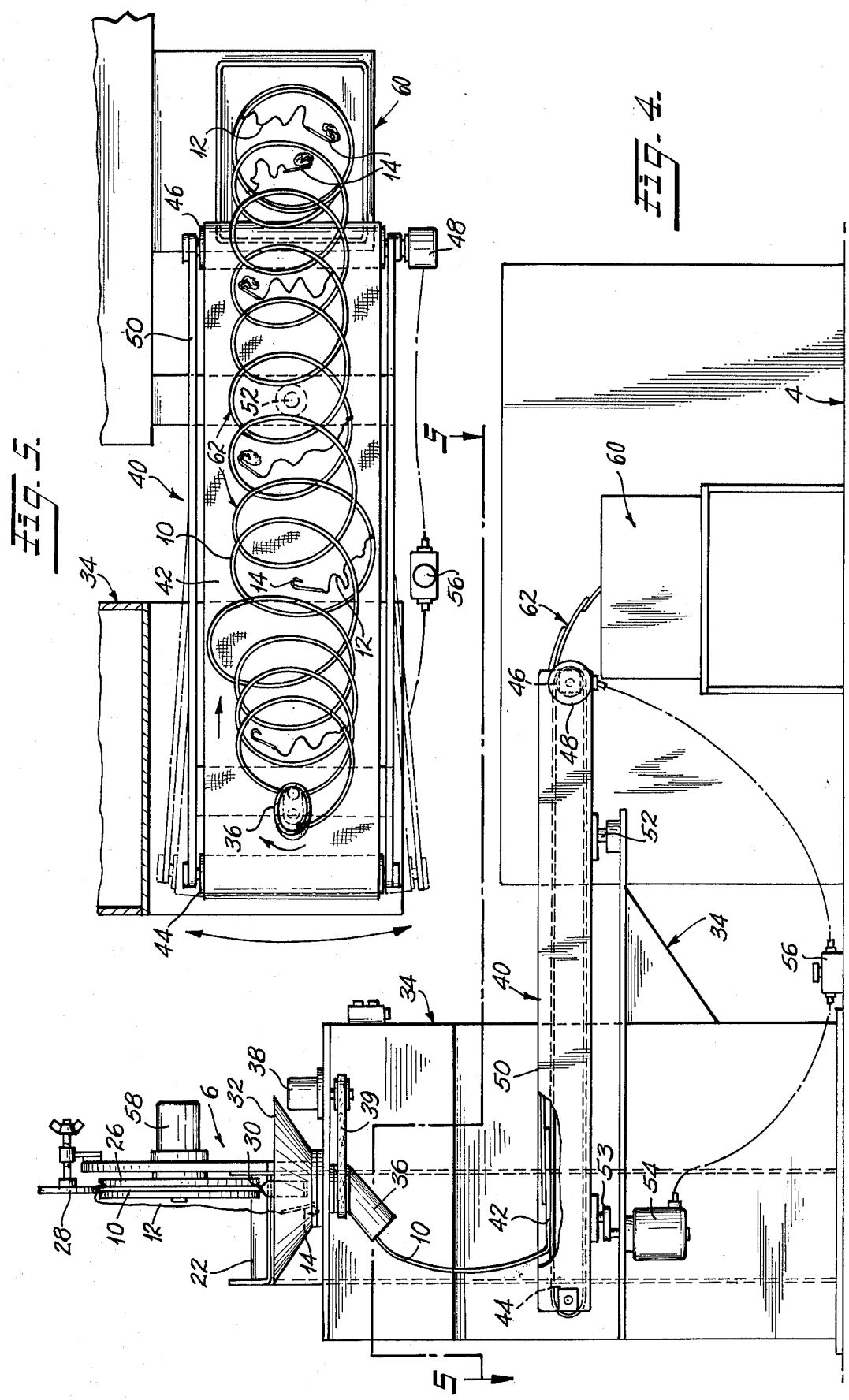

LONG LINE COILING APPARATUS

BACKGROUND OF THE INVENTION

This invention is in the field of line hauling and coiling devices, particularly for long fishing lines having spaced hooks thereon.

It is common in fishing for certain types of fish to employ long lines of, for example, 1,800 feet long with hook lines attached thereto and known as gangions, about 18 to 26 feet apart. Each of the gangions has a hook at its end. The hooks are baited and the lines let out in the water with suitable anchoring and/or float means at the ends and left in such position for a length of time to attract and catch fish. On many fishing vessels from 40 to 50 units are used per day and setting such lines in the water and hauling the same aboard present some problems and require much labor.

It has been proposed to employ a power driven grooved wheel arrangement, known as a gurdy, to haul the line aboard a vessel over suitable guide rollers mounted on the gunwale. As the lines come aboard, any fish thereon are manually removed and as the line leaves the gurdy, it is usually manually coiled and each hook must be provided with new bait. As is obvious, such manual manipulation is susceptible of causing the lines to become tangled, thus requiring more time and labor to effect handling the lines and conditioning them for redeployment in the water.

Previous attempts have been made to alleviate the foregoing problems by effecting coiling of the lines on a reel. Such reels have usually been provided with radial spokes to separate the gangions and render the hooks thereon more readily accessible but such devices have not proven entirely satisfactory. Some such prior devices have also had means for automatically baiting the hooks. Examples of such prior proposals are shown in the patents to Tison 3,626,630, 3,841,011 and 3,903,632.

SUMMARY OF THE INVENTION

The present invention contemplates the use of a gurdy as above described for hauling the long lines aboard a vessel and further contemplates directing the lines from the gurdy to a coiling machine to coil the line in horizontal coils with the hooks generally lying in the center thereof. The apparatus employs a conveyor belt to laterally displace each successive coil and thus avoid tangling of the line and rendering each hook readily accessible for manual rebaiting, particularly where the size of the hook or the bait used is not suitable for use with automatic baiting machines.

It is, therefore, an object of this invention to provide an improved apparatus for coiling long lines in a rigid and efficient manner without tangling.

BRIEF DESCRIPTION OF THE DRAWINGS

FIG. 1 is an end view of apparatus embodying the present invention shown on a schematically illustrated vessel shown in section;

FIG. 2 is a side elevational view, on an enlarged scale, of the apparatus of FIG. 1, as seen from the line 2—2 of FIG. 1;

FIG. 3 is a horizontal sectional view, on an enlarged scale, taken on the line 3—3 of FIG. 1;

FIG. 4 is a side elevational view on an enlarged scale as seen from line 4—4 of FIG. 1; and FIG. 5 is a horizontal sectional view taken on the line 5—5 of FIG. 4.

DESCRIPTION OF A PREFERRED EMBODIMENT

In FIG. 1, numeral 2 designates generally a suitable fishing vessel having a deck 4 on which the apparatus 6 of the present invention is mounted. As shown, the gunwale of the boat is provided with suitable and known guide rollers 8 over which a long line 10 and any fish thereon is guided when being hauled aboard. The long line 10 is provided with spaced gangions 12, each having a hook 14 at its free end. As the line is drawn aboard, any fish 16 thereon are removed as soon as it arrives on board. The line 10 is then guided partly around a guide sheave or pulley 18 having a known deflector arm 20 associated therewith. As each gangion 12 passes the pulley 18, the guide arm 20 directs the gangion 12 laterally to avoid tangling and directs the gangion 12 and its hook 14 into a generally U-shaped chute 22 having a curved upper portion 24. The chute 22 is positioned slightly laterally of a power driven grooved wheel or gurdy 26 over which the line 10 is directed. A hold-down wheel 28 holds the line 10 in the groove of the wheel 26 and a stripper finger 30 ensures that the line will not become stuck in the groove of the wheel. The gurdy thus described is well known. Directly below the discharge side of wheel 26 is a hopper 32 (see also FIG. 3) into which the line is directed. As can be seen, the gangions 12 and hooks 14 are guided by chute 22 to a position laterally of the wheel 26 and will drop from the curved upper portion of the chute into the hopper 32.

The hopper 32 is stationary and mounted on a frame 34 which also supports the chute 22, the power driven gurdy 26 and guide pulley 18. A downwardly sloping tubular coiling member or spout 36 is rotatably mounted on the frame 34 directly below the hopper 32 and is power driven by a suitable motor 38 and belt 39 (see FIG. 4) to rotate about a vertical axis. The bottom of hopper 32 opens into the interior of the rotating spout 36 and thus serves as a guide means for the line. The rotating spout 36 thus constitutes a line coiling device of generally known construction. Such coiling devices are used in many filament handling machines for the purpose of forming a filament into a stack of superimposed coils.

In the present instance, however, the coils formed by the coiling device are not deposited on a stationary surface or in a fixed container but are deposited on one end of the upper run of an endless belt conveyor 40 arranged with an end region thereof below the coiler spout 36. The endless belt device 40 consists of an endless belt 42 trained over rollers 44 and 46 and driven by a suitable motor 48. The rollers 44 and 46 are journalled on a supporting frame 50 that is pivotally mounted, at 52 on the supporting frame 34. Thus, the entire conveyor is capable of lateral oscillation about the vertical axis of pivot 52. The pivot 52 is horizontally spaced from the coiler tube 36, downstream of the conveyor from the coiler spout and the forward end of conveyor 40 is supported by a crank device 53 selectively rotatable by motor 54. When the motor 54 operates, it oscillates the forward end of the conveyor laterally of the vertical axis of the coiler spout 36. A suitable foot control 56 may be provided having controlling power to the motors 48 and 54 and preferably the arrangement is such that manipulation of the control will normally regulate the speed of operation of only the endless belt conveyor. Also, the control may be so designed that the motor 54 does not operate as long as the conveyor belt 42 is running but at any time that the belt 42 may be stopped, the motor 54 will be actuated to oscillate the conveyor laterally about pivot 52.

As shown in FIG. 4, the gurdy 26 is driven by a motor 58. The motors 38, 48, 54 and 58 may conveniently be hydraulic motors capable of independent or separate speed regulation although any other suitable type of motor may be used.

In operation, it is contemplated that the gurdy 26 will be continuously driven to haul the line 10 aboard at a substantially uniform rate. As the fish are removed from the line and the line is directed into the coiler spout 36, the latter forms successive horizontal coils on the line 10 on the upper run of conveyor belt 48 but since the conveyor belt is running each successive coil will be displaced from the previous coil, as clearly shown in FIG. 5 of the drawings. It is also to be noted that the line 10 issuing from the coiler spout 36 "balloons" in a circular path but the hooks 14 and gangions 12 drop nearly vertically from the outlet of the coiler spout 36 and each hook is deposited generally centrally within its coil, all as also indicated schematically in FIG. 5. An operator positioned adjacent the conveyor 40 in a position to operate the control 56 may readily and easily pick up successive hooks 14 from the conveyor belt, apply bait thereto, and redeposit the hook within its loop without having to manipulate the line or gangion to untangle the same from any other coils being formed.

As also shown in FIGS. 4 and 5, the coils at the discharge or right hand end of the conveyor 40 drop therefrom into a suitable bin or receiver 60 of sufficient size to receive an entire length of the long line hauled aboard and it will be obvious that the coils 62 will be discharged from the conveyor 40 to fall into the receiver 60 in superposed relation with one coil substantially directly above the other and with the hooks and bait in the central region of the coil. Thus, the long line may later be drawn from the receiver 60 and played out into the water without tangling.

The operator baiting the hooks on the conveyor 40 may find that the hooks are passing him too fast to be readily baited, in which case he may manipulate the control 56 to slow the conveyor to a proper speed, and the conveyor may be speeded up by operating the control 56 whenever desirable or necessary.

In the event it is necessary to stop operation of the conveyor 40, the gurdy 26 and coiler 36 continue to operate to form coils of line on the forward end of the conveyor belt. Under such conditions the motor 54 is caused to rotate and oscillate the conveyor laterally about pivot 52, as shown by dotted lines in FIG. 5. By this action successive coils of the line are deposited in slightly displaced relation in a lateral direction, thus minimizing any tendency for coils to become entangled. It is often also necessary to coil lines, such as buoy lines, having no gangions thereon and such coils are preferably laid in generally superposed relation. As described, however, the oscillating conveyor will cause such coils to be laid down in slightly overlapping relation and will not easily snarl.

While a single specific embodiment of the invention has been shown and described herein, the same is merely illustrative of the principles of the invention and other embodiments may be devised within the scope of the appended claims.

I claim:

1. A long line hauling and coiling apparatus for long lines having spaced gangions and hooks thereon, comprising:
   a power driven line hauling wheel;
   a rotatable line coiler device adjacent said wheel and guide means for directing a line from said wheel to said coiler device;
   chute means adjacent said wheel for directing gangions and hooks secured to said line to said guide means;
   a conveyor belt arranged to receive coils of line from said coiler device; and
   drive means for moving said conveyor belt at a selected speed whereby said line is deposited on said belt in successively displaced loops with said hooks lying within said loops.

2. Apparatus as defined in claim 1 wherein said conveyor belt is the upper run of an endless belt conveyor, and manually operable control means, adjacent said belt, for selectively regulating the speed of said drive means.

3. Apparatus as defined in claim 2 wherein said conveyor is mounted for horizontal oscillation about a vertical axis horizontally spaced from said coiler device, and selectively operable means for oscillating said conveyor about said axis.

4. Apparatus as defined in claim 3 wherein said last-named means comprises a drive motor and wherein said control means effects actuation of said drive motor when said conveyor is stopped.

* * * * *